(12) United States Patent
Nakaoki et al.

(10) Patent No.: US 8,031,575 B2
(45) Date of Patent: Oct. 4, 2011

(54) OPTICAL PICKUP DEVICE AND RECORDING/REPRODUCING DEVICE

(75) Inventors: Ariyoshi Nakaoki, Tokyo (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 257 days.

(21) Appl. No.: 12/370,965

(22) Filed: Feb. 13, 2009

(65) Prior Publication Data

US 2009/0219799 A1 Sep. 3, 2009

(30) Foreign Application Priority Data

Feb. 28, 2008 (JP) ................... 2008-048586
Jul. 3, 2008 (JP) ................... 2008-174774
Dec. 18, 2008 (JP) ................... 2008-322729

(51) Int. Cl.
*G11B 7/135* (2006.01)
(52) U.S. Cl. ................................. 369/112.23
(58) Field of Classification Search .......... None
See application file for complete search history.

(56) References Cited

U.S. PATENT DOCUMENTS

| 5,125,750 | A | 6/1992 | Corle et al. | |
| 5,602,820 | A * | 2/1997 | Wickramasinghe et al. | 369/126 |
| 6,791,913 | B1 | 9/2004 | Ishimoto | |
| 7,106,683 | B2 * | 9/2006 | Saito et al. | 369/112.24 |
| 7,440,383 | B2 * | 10/2008 | Saito et al. | 369/112.24 |
| 7,535,808 | B2 * | 5/2009 | Ishimoto et al. | 369/53.22 |
| 7,944,799 | B2 * | 5/2011 | Futakuchi et al. | 369/112.24 |
| 2003/0058777 | A1 * | 3/2003 | Martynov et al. | 369/112.24 |
| 2006/0255247 | A1 | 11/2006 | Saito et al. | |

FOREIGN PATENT DOCUMENTS

| JP | 5-189796 | 7/1993 |
| JP | 2001-76358 | 3/2001 |
| JP | 2006-344351 | 12/2006 |

OTHER PUBLICATIONS

Isao Ichimura, et al., "Near-Field Phase-Change Optical Recording of 1.36 Numerical Aperture", Japanese Journal of Applied Physics, vol. 39, Part 1, No. 2B, Feb. 2000, pp. 962-967.

Masataka Shinoda, et al., "High Density Near Field Optical Disc Recording", Digest of ISOM2004, We-E-03, P-94-000108, 2 pages.

(Continued)

*Primary Examiner* — Joseph Feild
*Assistant Examiner* — Parul Gupta
(74) *Attorney, Agent, or Firm* — Oblon, Spivak, McClelland, Maier & Neustadt, L.L.P.

(57) ABSTRACT

An optical pickup device has a near-field optical system having a numerical aperture of NA>1; a first light source emitting a first light having a first wavelength; a second light source emitting a second light having a second wavelength; an optical system multiplexing the first light and second light and irradiating the multiplexed light onto an optical recording medium having at least two recording layers; a first photodetector detecting the first light returned from the recording medium a second photodetector detecting the second light returned from the recording medium; a controller obtaining a signal corresponding to distance between the near-field optical system and the recording medium based on the returned second light, and obtaining a reproducing signal and a tracking signal of the recording medium and a focus signal corresponding to the recording layer based on the returned first light; and a focus position adjustment mechanism moving a focus position of the first light under control of the focus signal.

15 Claims, 8 Drawing Sheets

OTHER PUBLICATIONS

Minoru Takeda, et al., "Progress in Electron Beam Mastering of 100 Gbit/inch$^2$ Density Disc", Japanese Journal of Applied Physics, vol. 43, No. 7B, 2004, pp. 5044-5046.

Kimihiro Saito, et al., "A Simulation of Magneto-Optical Signals in Near-Field Recording", Japanese Journal of Applied Physics, vol. 38, Part 1, No. 12A, Dec. 1999, pp. 6743-6749.

\* cited by examiner

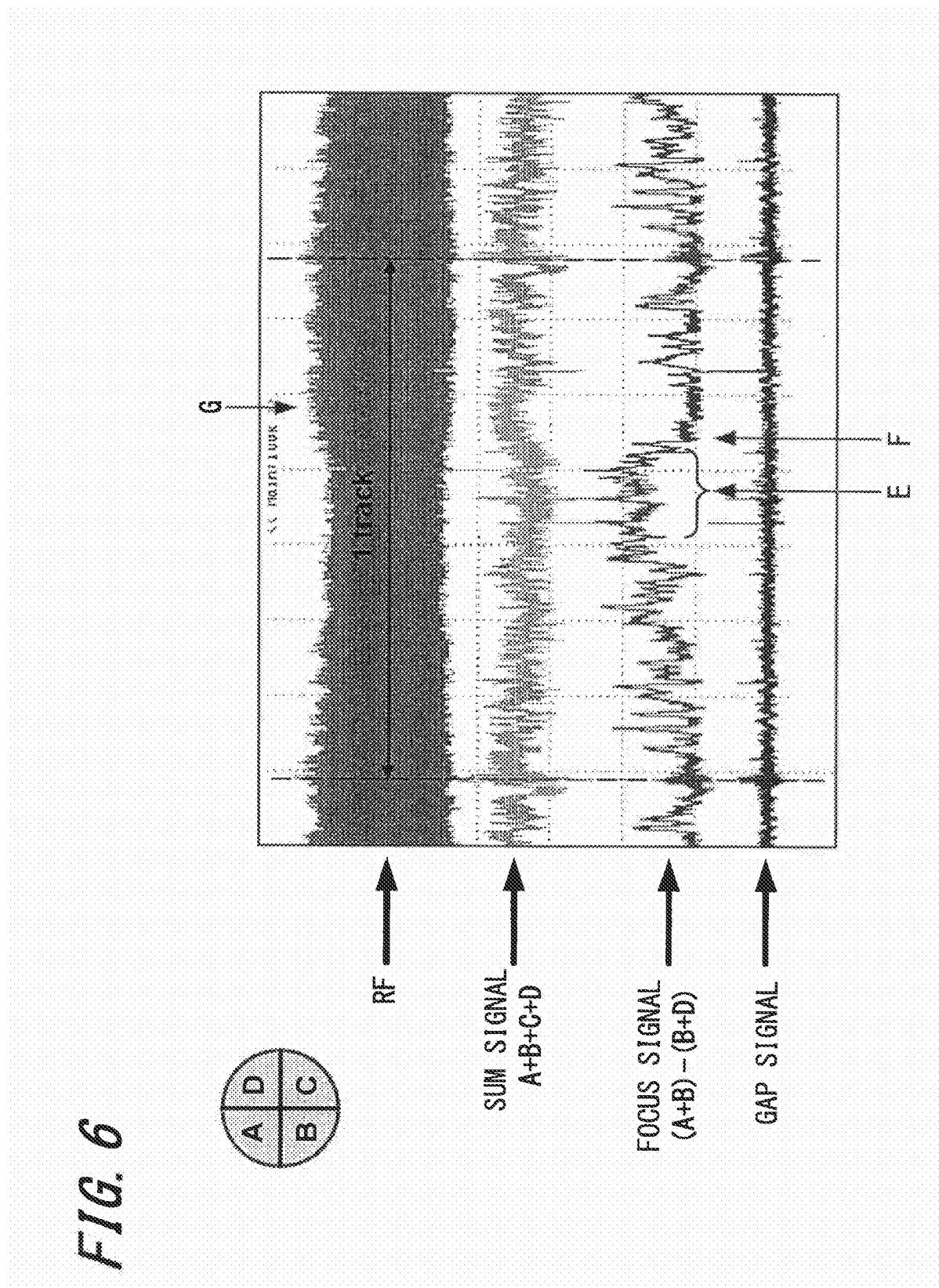

OPTICAL PICKUP DEVICE AND RECORDING/REPRODUCING DEVICE

CROSS REFERENCES TO RELATED APPLICATIONS

The present invention contains subject matter related to Japanese Patent Applications JP 2008-048586, JP 2008-174774, and JP 2008-322729 filed in the Japanese Patent Office on Feb. 28, 2008, Jul. 3, 2008, and Dec. 18, 2008, respectively, the entire contents of which being incorporated herein by reference.

BACKGROUND OF THE INVENTION

1. Field of the Invention

The present invention relates to an optical pickup device and a recording/reproducing device for at least either recording or reproducing information on/from an optical recording medium using near-field light.

2. Description of the Related Art

In recent years, much attention has been focused on a recording/reproducing method using near-field light in order to record/reproduce information on/from an information recording medium such as an optical disk, a magnetic disk, an optical memory card or the like at high density and high resolution. Near-field light is a kind of light leaked from an object on a light-irradiating side when the distance between the object on the light-irradiating side and an object on a light-irradiated side is smaller than a specified value. Near-field light is also called "evanescent wave".

Various proposals have been made as methods of recording/reproducing information by irradiating near-field light onto the information recording medium. Such proposals include, for example, methods of recording/reproducing information using a SIL (Solid Immersion Lens), a SIM (Solid Immersion Mirror), a waveguide structure or the like (see, for example, Patent Document: Japanese Unexamined Patent Application Publication No. 5-189796 and Non-Patent Document: "Near-Field Phase-Change Optical Recording of 1.36 Numerical Aperture", I. Ichimura et al., Japanese Journal of Applied Physics, Vol. 39, pp. 962-967, 2000). In the method of recording/reproducing information on/from an information recording medium capable of being recorded/reproduced at high density using a near-field light irradiating unit configured by a SIL and the like having a numerical aperture NA of more than 1, information is recorded/reproduced in a state where the distance between the lens and the surface of the information recording medium is reduced to a value small enough to cause the evanescent wave.

Various recording media such as a phase-change recording media, a read-only optical recording medium and the like are proposed to be used as the information recording medium for being recorded/reproduced at high density using near-field light (see, for example, Non-Patent Document: "High Density Near-Field Optical Disc Recording", M. Shinoda et al., Digest of ISOM2004, We-E-03, and Non-Patent Document: "Progress in Electron Beam Mastering of 100 Gb/inch2 Density Disc", M. Furuki et al., Japanese Journal of Applied Physics Vol. 43, pp. 5044-5046, 2004). The phase-change recording media has a configuration in which a reflective film formed of aluminum or the like, a dielectric layer formed of $SiO_2$ or the like, a phase-change material layer formed of GeSbTe or the like and a dielectric layer formed of $SiO_2$ or the like are sequentially laminated in this order on a substrate formed of glass, polycarbonate (PC) or the like. Further, the read-only optical recording medium has a configuration in which a reflective film formed of aluminum or the like is laminated on a substrate formed of glass, PC or the like, the substrate having rugged pits formed therein which correspond to recorded information. Further, in addition to the aforesaid optical recording media, other recording media such as a magneto-optical recording medium, an optical assistant magnetic recording medium and the like are also proposed to be used as the information recording medium for being recorded/reproduced using near-field light.

Further, it has been reported that, when using a near-field light irradiating unit configured by a SIL and the like, the distance between a lens-end-surface on the light-irradiating side and the surface of the optical recording medium is preferably no more than $1/10$ of the wavelength of irradiation light (see, for example, Non-Patent Document: "A Simulation of Magneto-Optical Signals in Near-Field Recording", K. Saito et al., Japanese Journal of Applied Physics, Vol. 38, pp. 6743-6749, 1999). For this reason, various researches have been conducted to develop a technology for precisely controlling a gap between the information recording medium and the SIL and the like, and develop a technology for performing a skew control to suppress collision of the SIL 141 and the like with the information recording medium while the information recording medium and the SIL 141 are moved relative to each other (see, for example, Japanese Unexamined Patent Application Publication No. 2001-76358 and Japanese Unexamined Patent Application Publication No. 2006-344351).

Further, in addition to the aforesaid recording/reproducing device of an information recording medium, an exposure device and the like using a SIL and the like have been proposed in the past (see, for example, Japanese Unexamined Patent Application Publication No. 2003-257052). The technology for precisely controlling the gap is also disclosed in Japanese Unexamined Patent Application Publication No. 2003-257052. According to this document, in the optical system of the exposure device, the focus position of a laser beam for detecting the gap is adjusted so that the laser beam is focused on an end surface of the SIL.

SUMMARY OF THE INVENTION

The aforesaid recording/reproducing method using near-field light can be conducted in the same manner as an ordinary recording/reproducing method of recording/reproducing an ordinary recording/reproducing medium except that the distance between the lens of SIL and the like and the surface of the information recording medium is very small. For this reason, like the ordinary recording/reproducing method, the recording/reproducing method using near-field light may also be used to record/reproduce information on/from a multilayer recording medium having a plurality of recording layers used for recording/reproducing information at high density in principle.

However, since spherical aberration caused by different optical distance in the media of the recording medium is proportional to the fourth power of the numerical aperture NA, the spherical aberration will become large in a near-field optical system having large numerical aperture NA. Thus, it becomes a very complicated work to design an optical lens capable of focusing near-field light on one of the plurality of recording layers to record/reproduce information.

Further, since the optical pickup device using near-field light has high numerical aperture NA, very high machining precision and assembling precision are required. Accordingly, in the case where near-field light is used to record/reproduce information on/from an optical recording medium having a plurality of recording layers, the method of adjusting the focus position of near-field light corresponding to each of the recording layers is deemed to be a very important technology.

Further, as mentioned above, in the optical pickup device using near-field light, the distance (gap length) between the surface of the near-field light irradiating unit configured by the SIL and the like and the surface of the information recording medium needs to be maintained at a specified value so that near-field light can be caused. Thus, in addition to controlling the objective lens which is driven when performing focus control, the distance between the surface of the near-field light irradiating unit and the surface of the information recording medium needs to be controlled so that near-field light can be caused. In other words, in the optical pickup device using near-field light, gap length control is performed separately from focus control relative to the recording layer. However, it is difficult to precisely perform the two different controls within the same optical system, and there is a concern that signal characteristic may be influenced.

In view of the aforesaid problems, it is desirable to provide an optical pickup device and a recording/reproducing device capable of precisely performing gap control and focus control with a relatively simple configuration when recording/reproducing information on/from an optical recording medium having a plurality of recording layers using near-field light.

An optical pickup device according to an embodiment of the present invention includes a near-field optical system, a first light source and a second light source, an optical system, a first photodetector, a second photodetector, a controller and a focus position adjustment mechanism. Further, the components configuring the optical pickup device have the following functions. The near-field optical system has a numerical aperture of NA>1. The first light source emits light having a first wavelength and the second light source emits light having a second wavelength. The optical system multiplexes the light having the first wavelength and the light having the second wavelength and irradiates the multiplexed light onto an optical recording medium having at least two recording layers. The first photodetector detects the light having the first wavelength returned from the optical recording medium, and the second photodetector detects the light having the second wavelength returned from the optical recording medium. The controller obtains a signal corresponding to the distance between a lens-end-surface of the near-field optical system and a surface of the optical recording medium based on the light having the second wavelength returned from the optical recording medium. Further, the controller obtains a reproducing signal of the optical recording medium, a tracking signal of the optical recording medium and a focus signal corresponding to each of the recording layers of the optical recording medium based on the light having the first wavelength returned from the optical recording medium. Further, the focus position adjustment mechanism is arranged in an optical path of the light having the first wavelength to move a focus position of the light having the first wavelength under control of the focus signal, the focus position being formed inside the optical recording medium.

Further, a recording/reproducing device according to the embodiment of the present invention includes the aforesaid optical pickup device, a mounting section for mounting the optical recording medium, and a drive section for moving the mounting section relative to the optical pickup section.

As can be known from the above, in the embodiment of present invention, two light sources are used, and the distance between the lens-end-surface of the near-field optical system and the surface of the optical recording medium is controlled using the light emitted from one of light sources (the second light source), i.e., the gap control is performed using the light emitted from the second light source. Further, the track control and the focus control are performed using the light emitted from the other light source (the first light source) by obtaining the other signals, i.e., the reproducing signal, the tracking signal and the focus signal of the optical recording medium. In such a manner, by individually arranging the light source for performing the gap control and the light source for performing the track control and the focus control, the optical system can be simply configured. Further, by separately providing the light source for performing the gap control and the light source for performing the track control and the focus control, a control signal for performing focus control and a control signal for performing gap control can be precisely separated from each other to perform the gap control and the focus control.

According to the embodiment of the present invention, when recording/reproducing information on/from an optical recording medium having a plurality of recording layers using near-field light, the gap control and the focus control can be precisely performed with a relatively simple configuration.

BRIEF DESCRIPTION OF THE DRAWINGS

FIG. 6 shows an example of waveforms of a RF signal, a focus signal and a gap signal detected by the optical pickup device according to the second embodiment;

DETAILED DESCRIPTION OF THE PREFERRED EMBODIMENT(S)

Preferred embodiments of the present invention will be described below. However, the present invention is not limited to the below embodiments.
1. First Embodiment: a basic example configuration.
2. Second Embodiment: an example configuration in which an optical mask is used in an optical system for performing focus control.
3. Third Embodiment: an example configuration in which a detecting light for gap control is defocused.

1. First Embodiment

[Configurations of Optical Pickup Section and Recording/Reproducing Device]

Figure 1:
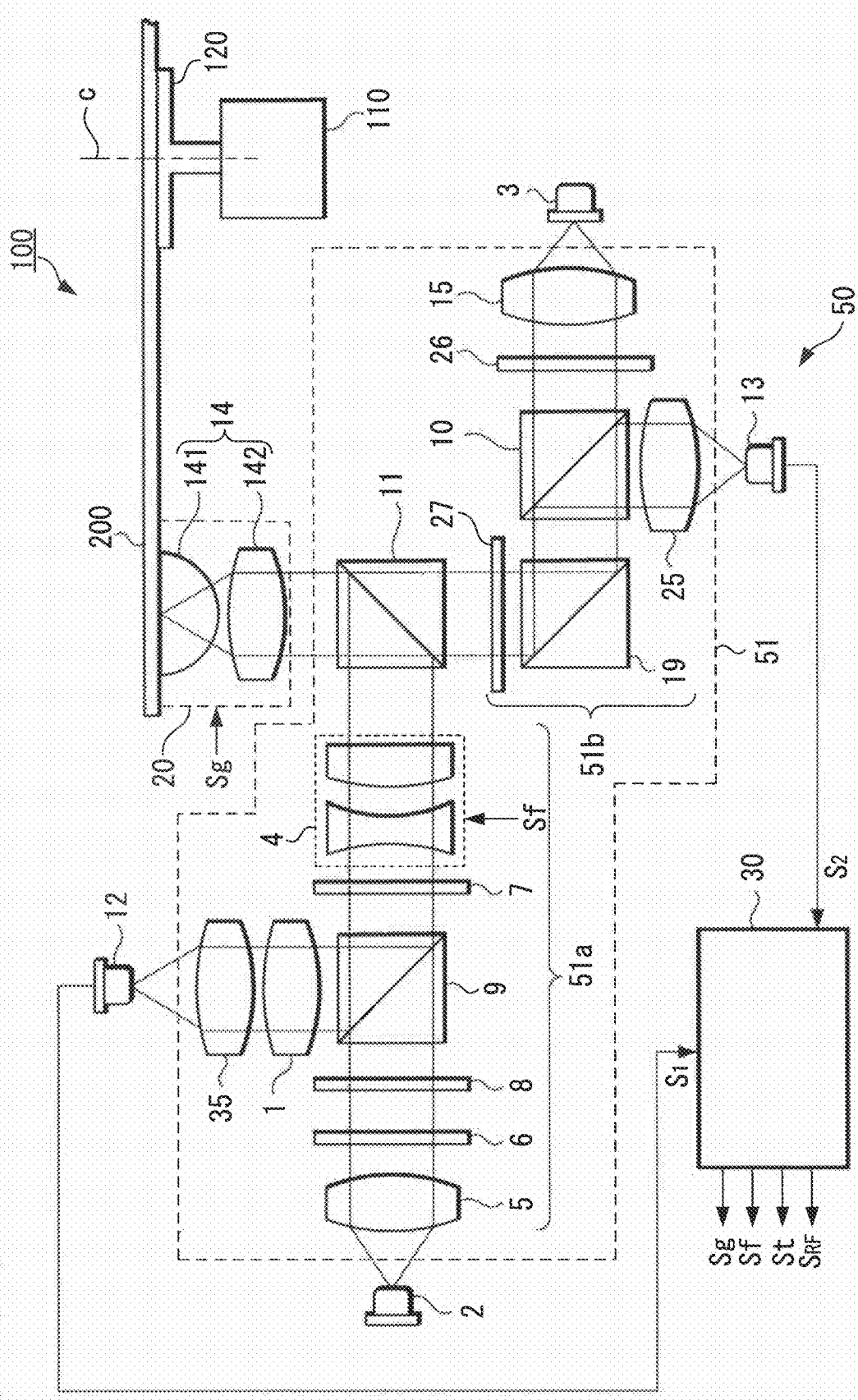
FIG. 1 is a view showing a schematic configuration of an optical pickup device according to a first embodiment of the present invention.

FIG. 1 is a view showing a schematic configuration of an example of an optical pickup device and a recording/reproducing device according to a first embodiment of the present invention.

A recording/reproducing device 100 includes an optical pickup section (optical pickup device) 50, a mounting section 120, and the rotary drive section 110 for rotary driving the mounting section 120. An optical recording medium 200 is, for example, a disc-like optical recording medium having a plurality of recording layers, and is mounted on the mounting section 120 of the recording/reproducing device 100. The mounting section 120 is connected to a rotary drive section (drive section) 110 and is rotated with a dashed line c of FIG. 1 as a central axis, the rotary drive section 110 being formed of a rotary drive unit such as a spindle motor or the like.

The optical pickup section 50 is disposed so as to face a recording layer side surface of the optical recording medium 200. The optical pickup section 50 is mounted on a moving device (not shown) moving along the surface of the optical recording medium 200, for example. The optical recording medium 200 is rotated by a rotary drive section 110, and the optical pickup section 50 moves, so that the optical pickup section 50 faces entire recording area of the surface of the optical recording medium 200.

The optical pickup section 50 includes a first light source 2, a second light source 3, a first photodetector 12, a second photodetector 13, a near-field optical system 14 and an optical system 51. The optical system 51 is arranged in an optical path of the light emitted from the first and second light sources 2, 3 and the light returned from the optical recording medium 200. Further, the optical pickup section 50 includes a controller 30.

The present embodiment gives an example in which the near-field optical system 14 is formed of an objective lens configured by a hemispherical SIL (solid immersion lens) 141 arranged on the side of the optical recording medium 200 and an optical lens 142 composed of an aspheric lens or the like. Note that, although the SIL is hemispherical in the present embodiment, the shape of the SIL may be properly changed. For example, a super hemispherical SIL may be used, or a SIL whose one end surface opposed to the optical recording medium 200 is cone-shaped may be used. Further, other near-field optical systems such as a near-field optical system configured by a SIM or a near-field optical system having a waveguide structure may also be used as the near-field optical system 14.

Further, in the present embodiment, a semiconductor laser emitting red band light (referred to as "red light" hereinafter) and a semiconductor laser emitting blue band light (referred to as "blue light" hereinafter) are used as light sources of the optical pickup section 50 for emitting lights having different wavelengths. In the present embodiment, a semiconductor laser emitting blue light having a wavelength of, for example, 405 nm is used as the first light source 2. On the other hand, a semiconductor laser emitting red light having a wavelength of, for example, 640 nm is used as the second light source 3. Note that, the wavelengths of the first light source 2 and second light source 3 are not limited to the aforesaid values but can be properly changed.

In the optical system 51, the light from the first and the second light sources 2, 3 is emitted to the near-field optical system 14, and the light returned from the optical recording medium 200 is emitted to the first photodetector 12 and the second photodetector 13. The optical system 51 includes a dichroic prism 11, a first optical system 51a and a second optical system 51b. Incidentally, the dichroic prism 11 is disposed at a position where the optical path of the light from the first optical system 51a and the light from the second optical system 51b cross each other.

The first optical system 51a includes a collimator lens 5, a half-wave plate 6, a grating 8, a PBS (polarization beam splitter) 9, a quarter-wave plate 7, a focus position adjustment mechanism 4 configured by two lenses for example, a cylindrical lens 1 and a condenser lens 35. Further, the collimator lens 5, the half-wave plate 6, the grating 8, the PBS 9, the quarter-wave plate 7, the focus position adjustment mechanism 4 and the dichroic prism 11 are arranged along the optical path of the light emitted from first light source 2 in this order from the side of the first light source 2. The near-field optical system 14 configured by the optical lens 142 and the SIL 141 is disposed in the optical path of the light emitted from the first light source 2 and reflected by the dichroic prism 11. Further, the end surface of the SIL 141 is arranged adjacent to and facing a surface of the optical recording medium 200 when the optical recording medium 200 is mounted on the optical pickup section 50. Further, the cylindrical lens 1, the condenser lens 35 and the first photodetector 12 are arranged in the optical path of the light returned from the optical recording medium 200 and reflected by the PBS 9 in this order from the side of the PBS 9.

On the other hand, the second optical system 51b includes a collimator lens 15, a half-wave plate 26, an NPBS (non-polarization beam splitter) 10, a PBS 19, a quarter-wave plate 27 and a condenser lens 25. Further, the collimator lens 15, the half-wave plate 26, the NPBS 10 and the PBS 19 are arranged along the optical path of the light emitted from second light source 3 in this order from the side of the second light source 3. Further, the quarter-wave plate 27 and the dichroic prism 11 are arranged in optical path of the light emitted from second light source 3 and reflected by the PBS 19 in this order from the side of the PBS 19, and the light from the first light source 2 and the light from the second light source 3 are multiplexed by the dichroic prism 11. On the other hand, the condenser lens 25 and the second photodetector 13 are arranged in the optical path of the light returned from the optical recording medium 200 and reflected by the NPBS 10 in this order from the side of the NPBS 10.

Further, based on the signals detected by the first photodetector 12 and the second photodetector 13, the controller 30 generates a RF (reproducing) signal $S_{RF}$, a tracking signal St and a focus signal Sf (so-called "focus error signal") to control the drive of the optical pickup section 50. Incidentally, although the present embodiment is described using an example in which the controller 30 is arranged inside the optical pickup section 50, the controller 30 may also be arranged outside the optical pickup section 50.

[Operation of Optical Pickup Section]

Next, the operation of the optical pickup section 50 of the present embodiment will be described below with reference to FIG. 1. First, operation of detecting the RF signal $S_{RF}$, the tracking signal St and the focus signal Sf using the blue light emitted from the first light source 2 will be described below.

In the optical system 51, the blue light emitted from the first light source 2 is collimated into collimated light by the collimator lens 5, passed through the half-wave plate 6 where the direction of linearly polarized light is adjusted, passed through the grating 8 and the PBS 9, and passed through the quarter-wave plate 7 where the blue light is converted into a circularly polarized light. Further, the blue light is passed through the focus position adjustment mechanism 4 where the focal length thereof is adjusted, and enters the dichroic prism 11 where the blue light is multiplexed with the red light emitted from the second light source 3. At this time, the focus position of the blue light is adjusted by the focus position adjustment mechanism 4 so that the blue light is focused at a position inside the optical recording medium 200. Incidentally, a part of the lens group configuring the focus position adjustment mechanism 4 may be formed of an optical element having aberration correction function. The aberration correction element may either be an optical element which electrically corrects the phase distribution, or be an optical element having a moving mechanism capable of moving the optical element between the inside and outside of the optical path.

Further, the blue light whose optical path is changed by the dichroic prism 11 is irradiated onto the surface of the optical recording medium 200 through the near-field optical system 14 (i.e., the optical lens 142 and the SIL 141). The return light from the optical recording medium 200 is branched by the PBS 9 through the near-field optical system 14, the dichroic prism 11, the focus position adjustment mechanism 4 and the quarter-wave plate 7. Thereafter the branched light is incident on the first photodetector 12 through the cylindrical lens 1 and the condenser lens 35. Thereafter a signal S1 detected by the first photodetector 12 is inputted to the controller 30, and the RF signal $S_{RF}$, the tracking signal St and the focus signal Sf are obtained.

Figure 2A:
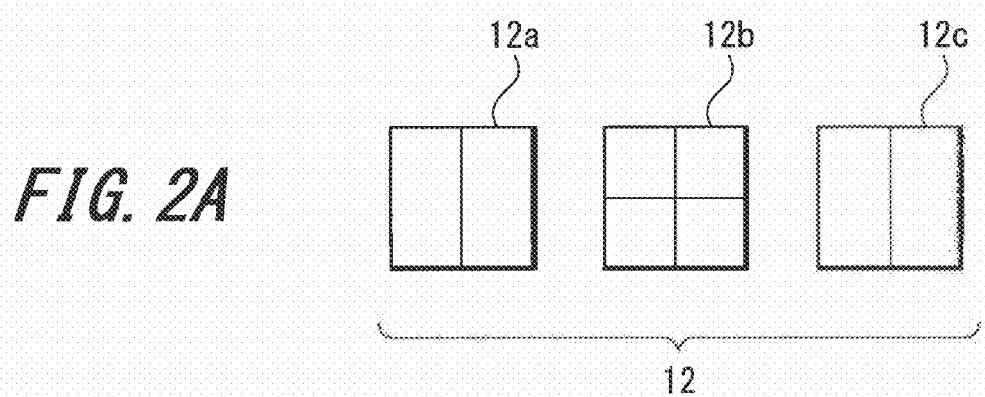
FIG. 2A and FIG. 2B are views each showing a schematic planar configuration of a photodetector of the optical pickup device according to the first embodiment.

At this time, the RF signal $S_{RF}$ can be detected by detecting a signal (full signal) obtained by summing the signals obtained in a plurality of light-receiving areas (detecting areas) of the first photodetector 12, and the tracking signal St can be obtained based on a push-pull signal detected by a bipartite detector. Further, in the case where the grating 8 is employed in the first optical system 51a, the optical pickup section may be configured in a manner in which the light emitted from the first light source 2 is divided into three beams and irradiated to the optical recording medium 200, and the tracking signal St is detected based on the return light from the optical recording medium 200. FIG. 2A shows a schematic planar configuration of an example of the light-receiving areas of the first photodetector 12 in such a case. As shown in such an example, when the first photodetector 12 is configured in a manner in which two bipartite detectors 12a, 12c are arranged at both sides of a quadripartite detector 12b, tracking can be performed using a three-spot method or a DPP (Differential Push-Pull) method.

Further, the focus signal Sf can be obtained using an astigmatism method by using the cylindrical lens 1 in the first optical system 51a. The focus signal Sf is inputted to the focus position adjustment mechanism 4. Based on the inputted focus signal Sf, the focus position adjustment mechanism 4 adjusts the focus position of the blue light irradiated to the optical recording medium 200. As a result, focus on each of the recording layers of the optical recording medium 200 can be precisely controlled.

Operation of detecting a gap control signal using the red light emitted from the second light source 3 will be described below with reference to FIG. 1 again. In the optical system 51, the red light emitted from the second light source 3 is collimated into a collimated beam by the collimator lens 15, passed through the half-wave plate 26 where the direction of linearly polarized light is adjusted, and reflected by the PBS 19 through the NPBS 10. Further, the red light reflected by the PBS 19 is passed through the quarter-wave plate 27 where the red light is converted into a circularly polarized light, entered into the dichroic prism 11 where the red light is multiplexed with the blue light emitted from the first light source 2, and irradiated to the optical recording medium 200 through the near-field optical system 14. Incidentally, the gap control may be better performed if the irradiated red light is adjusted so as to be roughly defocused from the surface of the optical recording medium 200, and, such an example configuration will be described later in a third embodiment.

The return light from the optical recording medium 200 is reflected by the PBS 19 through the near-field optical system 14, the dichroic prism 11 and the quarter-wave plate 27. At this time, the return light from the optical recording medium 200 is passed through the quarter-wave plate 27 where the circularly polarized light is converted into a linearly polarized light, however the polarization direction of the linearly polarized light (the return light) is perpendicular to the polarization direction of the linearly polarized light (the outgoing light) emitted from the second light source 3 to the quarter-wave plate 27. At this time, however, the return light passed through the quarter-wave plate 27 includes components whose direction is slightly rotated relative to the polarization direction of the return light corresponding to the gap length. Namely, the return light passed through the quarter-wave plate 27 includes the components whose direction is perpendicular to the polarization direction of the return light (i.e., the components whose direction is identical to the polarization direction of the outgoing light) corresponding to the gap length. Thus, when the return light passed through the quarter-wave plate 27 is incident on the PBS 19, the components whose direction is slightly rotated are reflected by the PBS 19. In the optical pickup section 50 according to the present embodiment, the components whose direction is slightly rotated are detected to perform the gap control.

Further, the return light reflected by the PBS 19 is reflected by the NPBS 10 and incident on the second photodetector 13 through the condenser lens 25. A signal S2 detected by the second photodetector 13 serves as a so-called "gap error signal" which is a signal corresponding to the distance between the end surface of the SIL 141 of the near-field optical system 14 and the surface of the optical recording medium 200. The signal S2 is inputted to the controller 30, so that the distance between the SIL 141 and the optical recording medium 200 can be precisely controlled by outputting a gap control signal Sg to a drive section 20 (an actuator) on which the objective lens configured by the optical lens 142 and the SIL 141 is mounted.

Figure 2B:
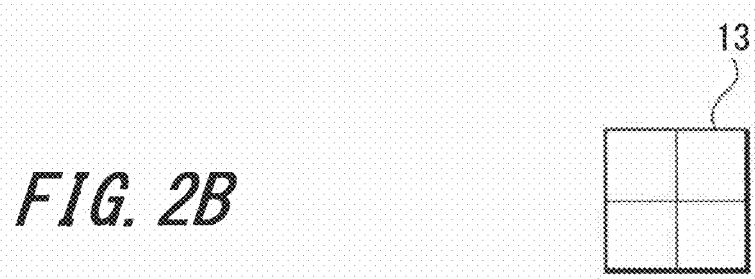

FIG. 2B shows a schematic planar configuration of an example of the light-receiving areas of the second photodetector 13. As shown in FIG. 2B, the second photodetector 13 is configured as a quadripartite detector 12b, and thereby push-pull signals in two directions can be calculated respectively. Further, since the second photodetector 13 is configured as a quadripartite detector 12b, a tilt adjustment can be performed both in a radial direction of the optical recording medium 200 and in a tangential direction perpendicular to the radial direction.

Figure 3:
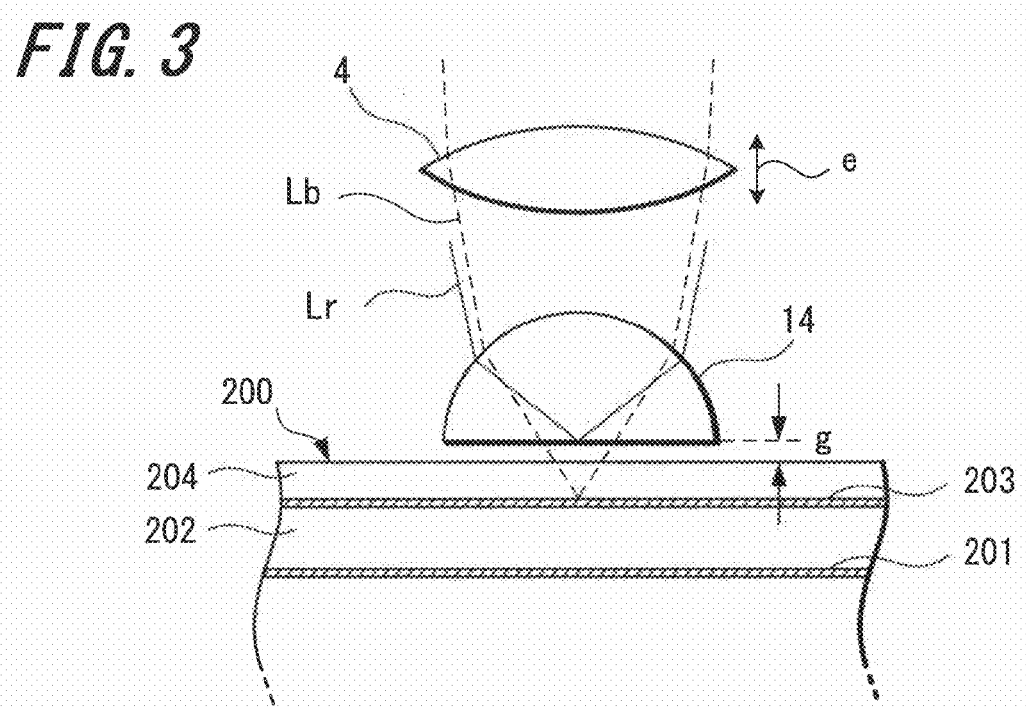
FIG. 3 is a view showing a schematic configuration of a primary portion of the optical pickup device according to the first embodiment.

As can be known from the above, in the optical pickup section 50 according to the present embodiment, the gap control signal can be detected using the light having a wavelength different from that of the light used for detecting the reproducing signal, the tracking signal and the focus signal, and FIG. 3 schematically shows the process. Note that, FIG. 3 shows an example of the optical recording medium 200 in which two recording layers 201 and 203 (referred to as "L0 layer 201" and "L1 layer 203" respectively hereinafter) are laminated to each other with an intermediate layer 202 interposed therebetween, and a protective layer (a top coating cover layer) 204 is provided to cover the L1 layer 203. However, the optical recording medium 200 may also be an optical recording medium having only one recording layer (information recording surface), or an optical recording medium having three or more recording layers.

In the example shown in FIG. 3, a gap g between the near-field optical system 14 configured by the SIL 141 and the like and the surface of the optical recording medium 200 is controlled using the return light of the red light Lr, for example. Further, the focus position adjustment mechanism 4 is controlled using the return light of the blue light Lb, for example, having a wavelength different from the red light Lr. Thus, the gap control and the focus control can be precisely performed using control signals separated from each other.

Further, in the optical system 51 according to the present embodiment, since the focus position adjustment mechanism 4 is arranged in the optical path of the blue light Lb only (i.e., the first optical system 51a) which is deviated from the optical path of the red light Lr used for performing gap control, the gap control can be stably performed using the red light Lr. In other words, as schematically shown by arrow e in FIG. 3, the gap control can be continuously performed without being interrupted even while the focus position adjustment mechanism 4 is being driven to adjust the focus position. More specific description may be made using an example in which the focus position of the blue light Lb is moved from the L0 layer 201 to the L1 layer 203 when reproducing information recorded in the optical recording medium 200 shown in FIG. 3. In such a case, the blue light Lb is once defocused from the L0 layer 201 and then focused on the L1 layer 203. Since the gap control is performed using the light source (the control signal) separated from the light source used for performing the focus control, the gap control can be continuously performed without being interrupted even while the focusing operation is being performed. In other words, the gap control can be continued even in a state where the blue light is defocused. As a result, the recording/reproducing system can operate more stably by using the optical system 51 shown in FIG. 1.

As can be known from the above, according to the present embodiment, when recording/reproducing information on/from the optical recording medium using near-field light, the gap control and the focus control can be precisely performed with the optical system having relatively simple configuration. Accordingly, according to present embodiment, it becomes relatively easy to apply a recording/reproducing method of recording/reproducing information using near-field light particularly to an optical recording medium having a plurality of recording layers. Further, in the optical pickup device and the recording/reproducing device according to the present embodiment, the focus adjustment can be achieved by a practical mechanism. Thus, with the present embodiment, it becomes possible to provide a near-field optical recording medium having large capacity.

2. Second Embodiment

Figure 4:
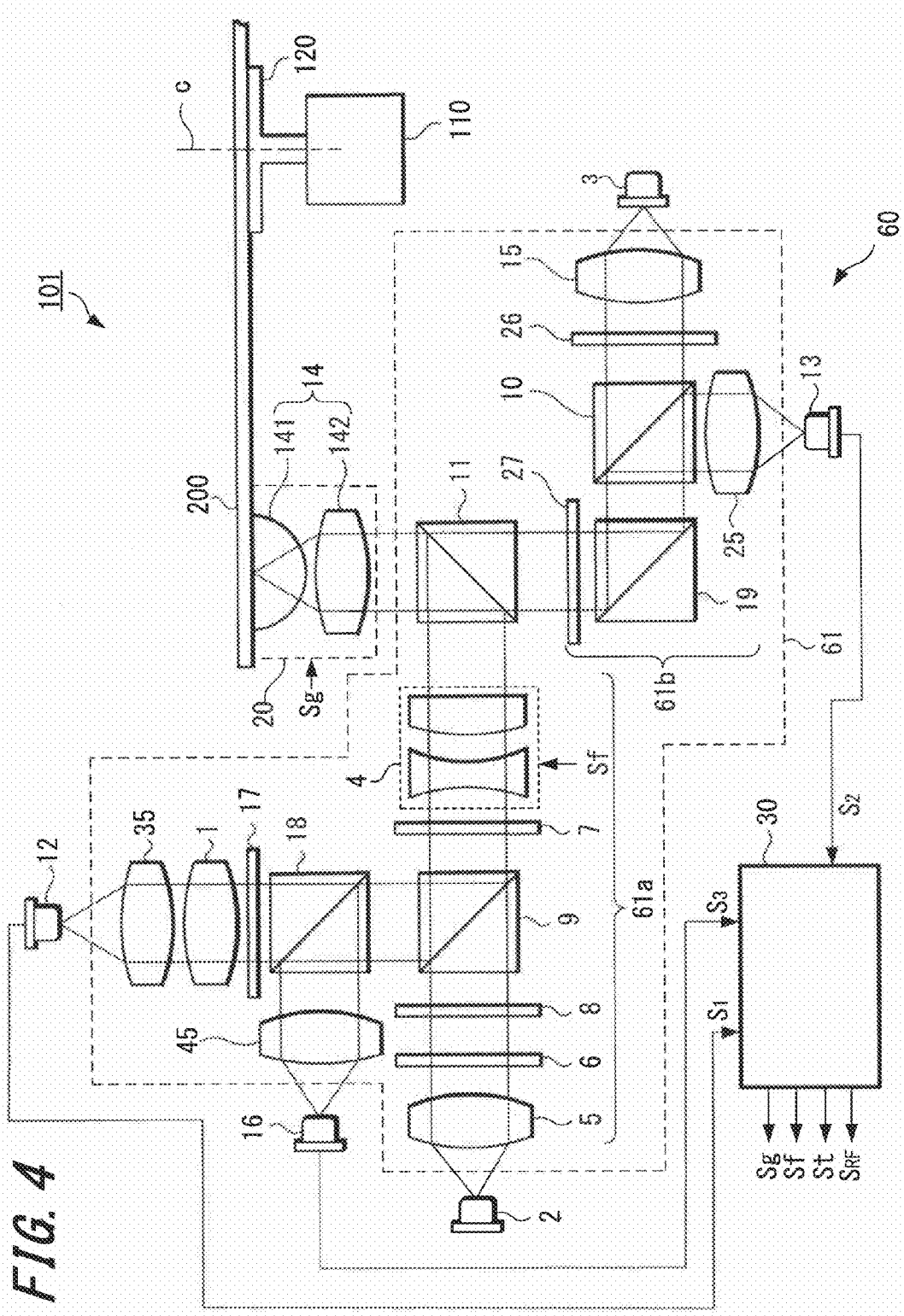
FIG. 4 is a view showing a schematic configuration of an optical pickup device according to a second embodiment of the present invention.

In a second embodiment, an example configuration is given in which an optical mask is used in the focus control optical system of the optical pickup device and the recording/reproducing device of the first embodiment. FIG. 4 shows a schematic configuration of an example of an optical pickup section and a recording/reproducing device according to the second embodiment of the present invention. In FIG. 4, like components are denoted by like numerals as of FIG. 1 and the explanation thereof is omitted.

In the present embodiment, an example is described in which a semiconductor laser emitting blue light and a semiconductor laser emitting red light are respectively used as a first light source 2 and a second light source 3. Further, in the present embodiment, a NPBS 18, an optical mask 17 and a condenser lens 45 are arranged between a PBS 9 and a cylindrical lens 1 within a first optical system 61a. Further, a third photodetector 16 for detecting the light emitted from the condenser lens 45 is provided. Other configurations are the same as those of the optical pickup device and the recording/reproducing device of the first embodiment shown in FIG. 1.

In an optical system 61 of the present embodiment, the return light of the blue light branched (reflected) by the NPBS 18 is incident on the third photodetector 16. On the other hand, the return light passed through the NPBS 18 is incident on a first photodetector 12 through the optical mask 17, the cylindrical lens 1 and a condenser lens 35.

Figure 5A:
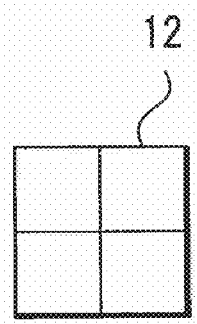
FIGS. 5A to 5C are views each showing a schematic planar configuration of a photodetector of the optical pickup device according to the second embodiment.
Figure 5B:
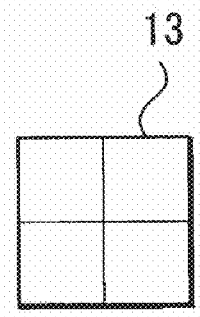
Figure 5C:
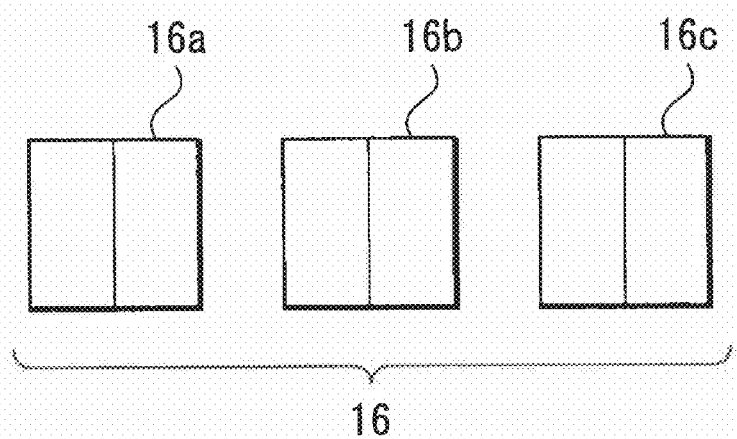

FIG. 5A shows a schematic planar configuration of light-receiving areas of the first photodetector 12 of the present embodiment. As shown in FIG. 5A, it is preferred that a quadripartite detector is used as the first photodetector 12. Further, FIG. 5B shows a schematic planar configuration of light-receiving areas of a second photodetector 13 of the present embodiment. The second photodetector 13 is configured as a quadripartite detector, thereby not only a gap control signal, but also a tilt control signal for performing tilt control both in a radial direction and in a tangential direction can be obtained. Further, FIG. 5C shows a schematic planar configuration of light-receiving areas of the third photodetector 16 of the present embodiment. The third photodetector 16 is configured by three bipartite detectors 16a, 16b and 16c, thereby tracking can be performed using a three-spot method or a DPP method.

Further, in the present embodiment, the blue return light falls in the area where NA<1 in the near-field optical system 14 is masked by the optical mask 17, so that the focus position is obtained only from the blue return light falls in the area where NA>1. Due to such an arrangement, stray components returned from the other layers of the optical recording medium 200 can be substantially cut, so that a high-quality focus signal Sf can be obtained. In other words, with the optical pickup section 60 of the present embodiment, not only the gap control and the focus control can be performed with an optical system having relatively simple configuration, but also the focus control can be performed with higher precision.

FIG. 6 shows an example of the waveform of the focus signal detected by the first photodetector 12 in the example configuration of the optical pickup section 60 according to the present embodiment. FIG. 6 also shows a RF signal detected by the third photodetector 16, a sum signal (A+B+C+D) detected by the first photodetector 12 and a gap signal detected by the second photodetector 13. Incidentally, FIG. 6 shows waveforms of approximately one track. The configuration of the optical system and the optical recording medium and the recording/reproducing condition under which the detection shown in FIG. 6 is performed is as follows.

Effective numerical aperture of the near-field optical system NAeff: 1.45

Number of the recording layers of the optical recording medium: 2

Film thickness of the top coating cover layer of the optical recording medium: 1 μm Film thickness of the intermediate layer between the recording layers of the optical recording medium: 3 μm Material of the recording layers of the optical recording medium: Phase change material for each of the recording layers Linear speed: 3.8 m/s Reproduction power: 0.5 mW Recording method: 1-7 random modulation method Line density of recording mark: 70 nm/bit In FIG. 6, the area indicated by arrow E represents an area where the focus error signal occurs, and the time indicated by arrow F represents the time when the focus control is performed. As can be known from FIG. 6, after the focus control has been performed (i.e., after arrow F), amplitude of the RF reproducing signal is restored in the area indicated by arrow G, and thereafter sufficient amplitude of the RF reproducing signal is stably obtained. Incidentally, the sum signal (A+B+C+D) is maintained at a substantially constant level, which means that the change occurring in the area indicated by arrow E shown in FIG. 6 is not caused by the change of the surface reflectance or the like (i.e., flawed film or the like).

It can be known from FIG. 6 that, during the process of performing the focus control using the focus error signal (area E) to stabilize the RF signal, the gap error signal is stably outputted constantly without being disturbed by the focus control. Thus, it is confirmed from the above that is possible to stably record/reproduce information on/from an optical recording medium having one or more recording layers using near-field light.

As can be known from the above description, according to the present embodiment, when recording/reproducing information on/from the optical recording medium using near-field light, the gap control and the focus control can also be precisely performed with an optical system having relatively simple configuration. Accordingly, according to present embodiment, it becomes relatively easy to apply a recording/reproducing method of recording/reproducing information using near-field light particularly to an optical recording medium having a plurality of recording layers. Further, in the optical pickup device and the recording/reproducing device according to the present embodiment, the focus adjustment can be achieved by a practical mechanism. Thus, with the present embodiment, it becomes possible to provide a near-field optical recording medium having a large capacity.

3. Third Embodiment

An example configuration of an optical pickup device and a recording/reproducing device having the optical pickup device according to a third embodiment are described below. As can be known from the above that, in the optical pickup device using a near-field light optical system configured by a SIL and the like, the distance (i.e., the gap) between the lens and the recording medium needs to be precisely controlled. In practice, when recording/reproducing information on/from the recording medium using the SIL and the like, the gap needs to be controlled with a precision of about 1/100 of the wavelength of the light incident on the SIL and the like. However, if there is dust, foreign matter or the like on the surface or inside the protective layer of the recording medium, noise signal will be superimposed on the gap control signal, and therefore precision of the gap control will be extremely increased, or the gap control itself will become failed. An example configuration of an optical pickup device and a recording/reproducing device capable of solving the aforesaid problems is described in the third embodiment.

Figure 7:
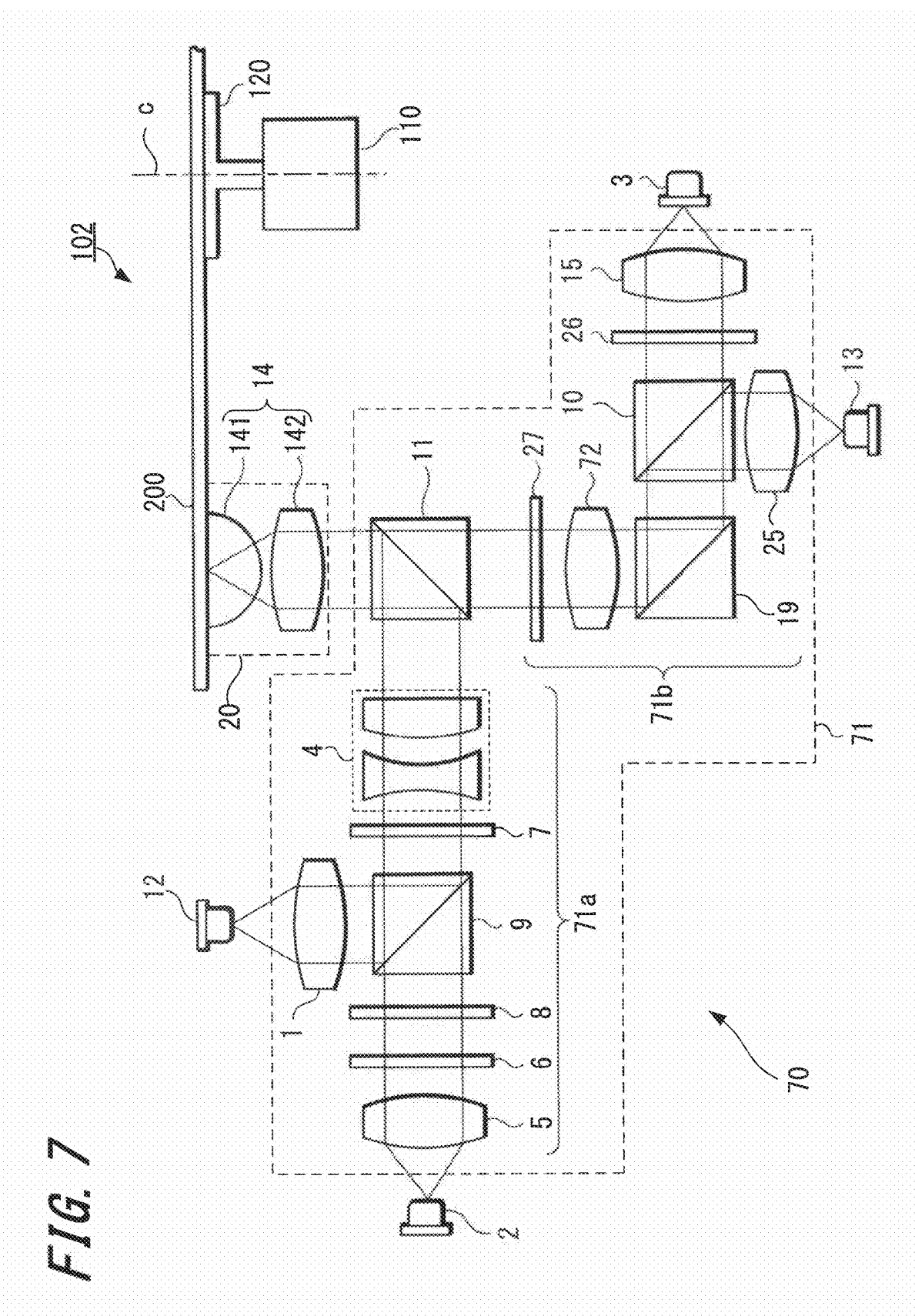
FIG. 7 is a view showing a schematic configuration of an optical pickup device according to a third embodiment of the present invention.

FIG. 7 shows a schematic configuration of an example of an optical pickup section (the optical pickup device) and the recording/reproducing device according to the third embodiment of the present invention. In FIG. 7, like components are denoted by like numerals as of the optical pickup device and the recording/reproducing device of the first embodiment shown in FIG. 1. Further, in order to facilitate description, the controller (the controller 30 in FIG. 1, for example) for generating the control signal such as the gap signal Sg and the like is omitted in FIG. 7.

As can be known by comparing an optical pickup section 70 of the present embodiment with the optical pickup section 50 of the first embodiment, the present embodiment differs from the first embodiment in that the configuration of a second optical system 71b of the present embodiment is different from that of the first embodiment. Incidentally, the configuration of a first optical system 71a of the present embodiment differs from the first optical system 51a of the first embodiment in that the condenser lens 35 in the first optical system 51a is omitted, and the operation of the first optical system 71a is substantially identical to that of the example shown in FIG. 1. Thus, the description of the configuration of the second optical system 71b will be omitted herein except for the aforesaid difference compared with the first embodiment.

In the present embodiment, a semiconductor laser emitting blue light is used as a first light source 2, and a semiconductor laser emitting red light is used as a second light source 3. Note that, the wavelengths of the first light source 2 and second light source 3 are not limited to the aforesaid values but can be properly changed. Further, in the present embodiment, the first optical system 71a can be replaced by, for example, the first optical system 51a shown in FIG. 1 or the first optical system 61a shown in FIG. 4.

The second optical system 71b of the present embodiment is configured by further arranging a condenser lens 72 (an optical lens) in the optical path between the PBS 19 and the quarter-wave plate 27 of the second optical system 51b shown in FIG. 1.

The condenser lens 72 is a lens for adjusting the focus position of the light for performing gap control. The focal length of the condenser lens 72 is adjusted so that the light for performing gap control is defocused from the end surface of the SIL 141 from which the light is emitted, defocused from the surface of the recording medium and defocused from the information recording layer(s) for example. In other words, in the present embodiment, the condenser lens 72 is desired in a manner so that the red light used for performing gap control is focused at a position other than boundary portion between any two different media in the optical path thereof. Incidentally, the focus position of the red light used for performing gap control can also be adjusted by moving the condenser lens 72 along the optical path.

Figure 8:
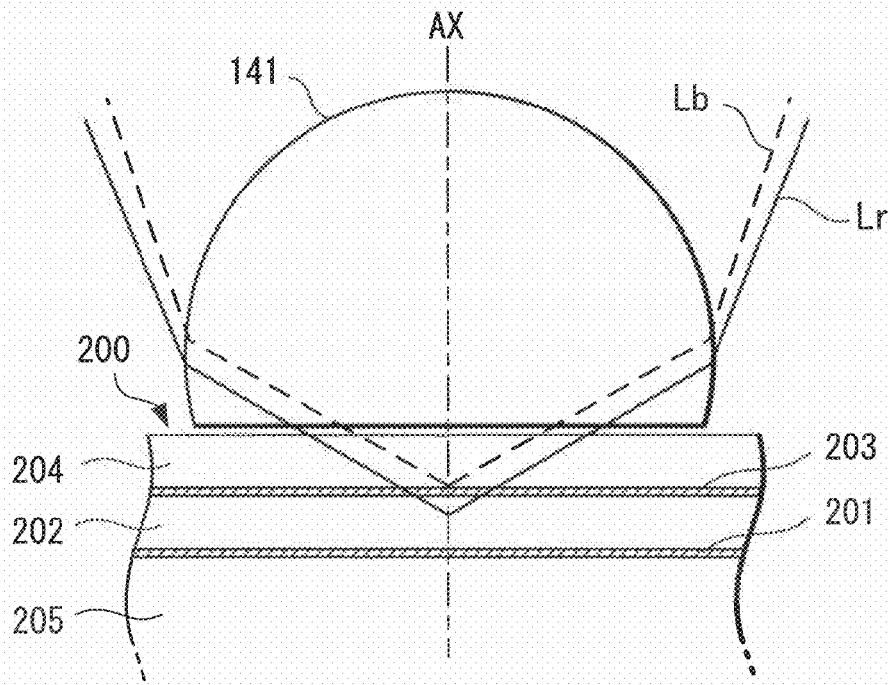
FIG. 8 is a view schematically showing an adjusted state of a focus position of light used for performing gap control according to the third embodiment.
Figure 9:
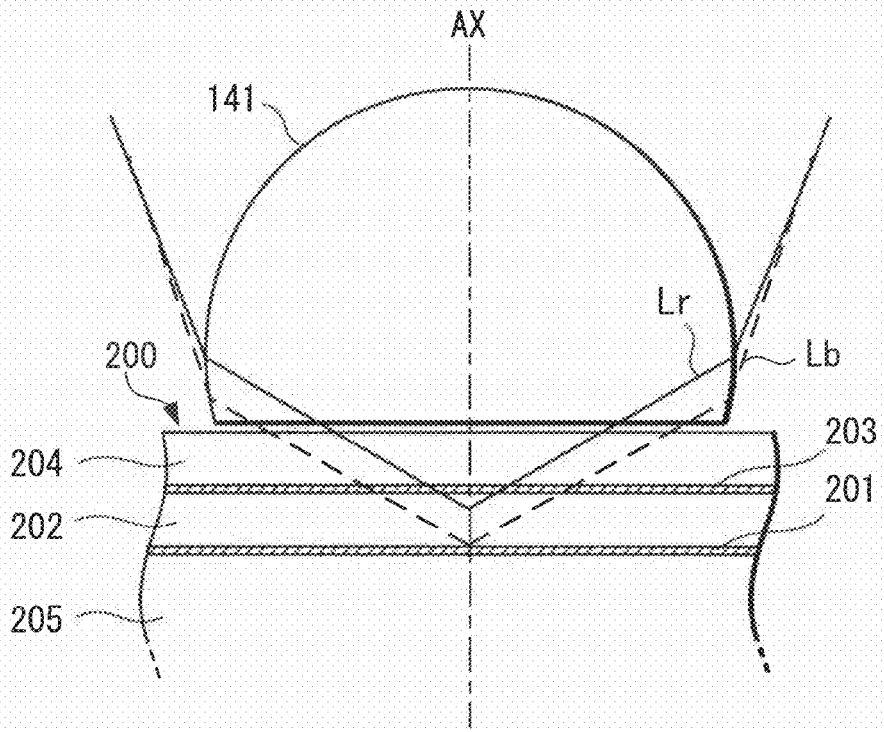
FIG. 9 is a view schematically showing another adjusted state of the focus position of the light used for performing gap control according to the third embodiment.

FIGS. 8 and 9 each schematically show an example of an adjusted state of the focus position of the red light used for performing gap control. In FIGS. 8 and 9, the broken line represents the blue light Lb used for performing the recording/reproducing, the tracking control and focus control, and the solid line represents the red light Lr used for performing the gap control. Further, in FIGS. 8 and 9, the dashed line represents an optical axis AX. Incidentally, in the examples shown in FIGS. 8 and 9, the optical recording medium 200 has a configuration in which the recording layer 201, the intermediate layer 202 formed of a dielectric material or the like, the recording layer 203 and the protective layer 204 are laminated in this order on a substrate 205.

FIG. 8 shows an adjusted state of the focus position of the red light used for performing gap control when recording/reproducing information on/from the L1 layer 203 of the optical recording medium 200. In the example shown in FIG. 8, the blue light Lb is focused on a surface on the SIL 141 side of the L1 layer 203 (the information recording surface), in other words, the blue light Lb is focused on the interface between the L1 layer 203 and the protective layer 204. While the red light Lr used for performing gap control is focused at a position inside the intermediate layer 202.

On the other hand, FIG. 9 shows an adjusted state of the focus position of the red light used for performing gap control when recording/reproducing information on/from the L0 layer 201 of the optical recording medium 200. In the example shown in FIG. 9, the blue light Lb is focused on a surface on the SIL 141 side of the L0 layer 201, in other words, the blue light Lb is focused on the interface between the L0 layer 201 and the intermediate layer 202. While the red light Lr used for performing gap control is focused on the inside of the intermediate layer 202.

The aforesaid dust, foreign matter or the like, which will decrease the precision of the gap control, is apt to exist on the surface of the protective layer 204 or in interfaces between any two different media such as the interface between the protective layer 204 and the L1 layer 203. This is because when sequentially laminating each of the layers during the manufacturing process, dust, foreign matter or the like is apt to adhere to the surface of each of the layers to be laminated. Thus, if the focus position of the red light used for performing gap control is adjusted so that the red light used for performing gap control is focused at a position other than the boundary portion between any two different media like the present embodiment, then the red light used for performing gap control will be defocused from the boundary portion between any two different media where dust, foreign matter or the like is apt to exist. As a result, the strength of the return light from the boundary portion becomes weak, therefore the noise signal caused by dust, foreign matter or the like can be reduced. Thus, with the present embodiment, deterioration in the precision of the gap control can be suppressed, and operation can be performed more stably.

Further, similar to the first and second embodiments, in the third embodiment, the gap between the near-field optical system 14 configured by the SIL 141 and the like and the surface of the optical recording medium 200 is controlled by using the return light of the red light Lr, and the focus position adjustment mechanism 4 is controlled by the return light of the blue light Lb. Thus, with the present embodiment, it is also possible to precisely perform the gap control and the focus control using control signals separated from each other with an optical system having relatively simple configuration.

Note that, although the examples shown in FIGS. 8 and 9 are described using an example in which the red light Lr for performing gap control is focused at a position inside the intermediate layer 202 interposed between the L1 layer 203 and the L0 layer 201, the present invention is not limited thereto. The red light Lr may be focused at any position other than the position on the interface between any two different media. For example, the red light Lr for performing gap control may also be focused at a position inside the protective layer 204 covering the L1 layer 203, or be focused at a position inside the substrate 205. Further, although the red light Lr may be focused at a position inside each of the recording layers in principle, since the recording layer has very small thickness, it is preferred that the red light Lr is focused at a position inside the intermediate layer 202, the protective layer 204, the substrate 205 or the like, which have large thickness compared with the recording layer, so that the focus position and the like can be easily adjusted.

Figure 10:
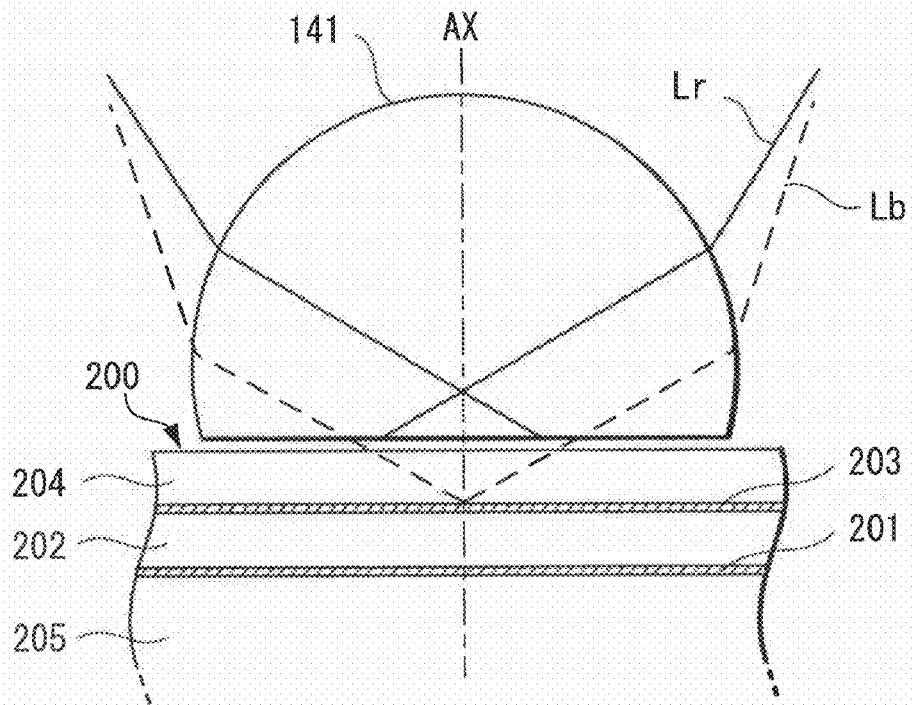
FIG. 10 is a view schematically showing further another adjusted state of the focus position of the light used for performing gap control according to the third embodiment.

Further, the red light Lr for performing gap control may also be focused at a position inside the SIL 14, and in such a case, an adjusted state of the focus position is schematically showed in FIG. 10. In such a case, since the red light Lr for performing gap control is defocused from the boundary portion between any two different media, deterioration in the precision of the gap control can be suppressed.

Further, although the examples shown in FIGS. 8 to 10 are described using an example in which the optical pickup device according to the present embodiment is applied to an optical recording medium having two recording layers, the present invention is not limited thereto. For example, the optical pickup device according to the present embodiment may also be applied to a multi-layer recording medium having three or more recording layers to achieve the identical advantages.

Figure 11:
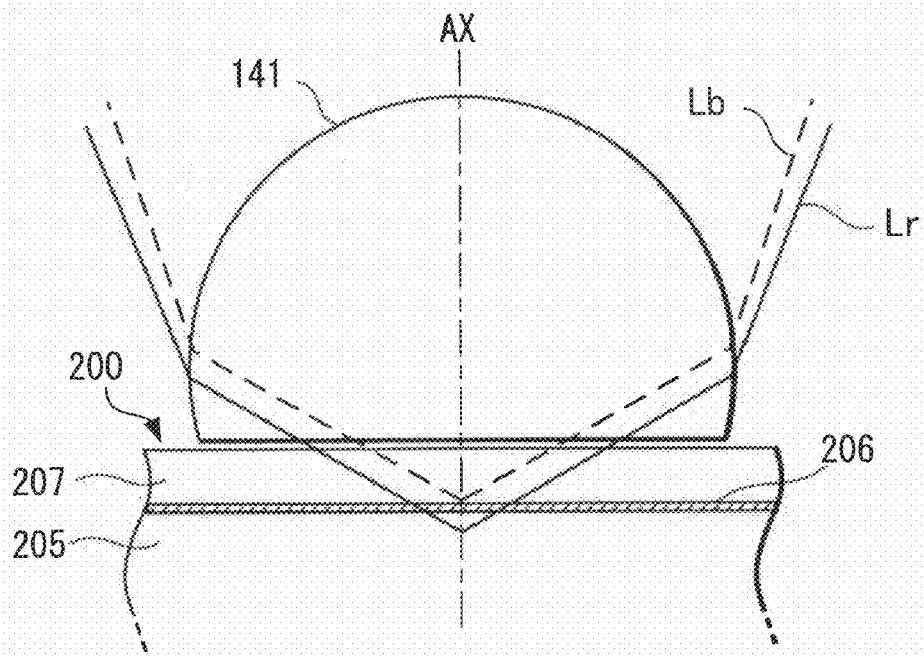
FIG. 11 is a view schematically showing further another adjusted state of the focus position of the light used for performing gap control according to the third embodiment.

Further, the optical pickup device according to the present embodiment may also be applied to a recording medium having one recording layer (information recording surface), and in such a case, an adjusted state of the focus position is schematically showed in FIG. 11. In the example shown in FIG. 11, the blue light Lb used for performing recording/reproducing, the focus control and the tracking control is focused on a surface on the SIL 141 side of a recording layer 206 (i.e., an interface between the recording layer 206 and a protective layer 207). While the red light Lr for performing gap control is focused at a position within a substrate 205.

As can be known from the above, according to the present embodiment, deterioration in precision of the gap control can be suppressed, and operation can be performed stably. Further, according to the present embodiment, a recording medium having a protective layer can be used more easily as an information recording medium used to be recorded/reproduced with near-field light. Thus, according to the present embodiment, the gap control and the focus control can be precisely performed using the optical system having relatively simple configuration. Thus, according to the present embodiment, the information recording medium used to be recorded/reproduced with near-field light, the optical pickup device using near-field light and the recording/reproducing device can be put into practical use eventually.

It is to be understood that the present invention is not limited to the first, second and third embodiments described above, and various modifications and variations can be made without departing from the configuration of the present invention.

For example, although the optical pickup devices and the recording/reproducing devices according to the first, second and third embodiments are described using an example in which information is recorded/reproduced on/from the optical recording medium using near-field light, the present invention is not limited thereto. For example, the present invention may also be applied to an optical pickup device and a recording/reproducing device for recording/reproducing information on/from a magneto-optical recording medium, an optical assistant magnetic recording medium or the like using near-field light to achieve the identical advantages.

Further, although the blue light is used as light having a first wavelength and the red light is used as light having a second wavelength, the present invention is not limited thereto but the light having the first wavelength and the light having the second wavelength may be properly changed according to necessity. Incidentally, the first wavelength and the second wavelength may also be the same. However, since the two return lights are individually detected separately from each other, it is preferred that the first wavelength differs from the second wavelength so that the configuration of the optical system can be simplified. Further, since the light having the first wavelength is used to record/reproduce information, it is preferred that the wavelength of the light having the first wavelength is as short as possible, so that information can be recorded/reproduced at high density and high resolution.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup device comprising:
   a near-field optical system having a numerical aperture of NA>1;
   a first light source that emits light having a first wavelength and a second light source for emitting light having a second wavelength;
   an optical system that multiplexes the light having the first wavelength and the light having the second wavelength, and irradiates the multiplexed light onto an optical recording medium having at least two recording layers;

a first photodetector that detects the light having the first wavelength returned from the optical recording medium and a second photodetector that detects the light having the second wavelength returned from the optical recording medium;

a controller that obtains a signal corresponding to a variable distance between a lens-end-surface of the near-field optical system and a surface of the optical recording medium based on the light having the second wavelength returned from the optical recording medium, and obtains a reproducing signal of the optical recording medium, a tracking signal of the optical recording medium and a focus signal corresponding to each of the recording layers of the optical recording medium based on the light having the first wavelength returned from the optical recording medium; and a focus position adjustment mechanism arranged in an optical path of the light having the first wavelength that moves a focus position of the light having the first wavelength under control of the focus signal, the focus position being formed inside the optical recording medium.

2. The optical pickup device according to claim 1, wherein the focus signal is detected using light with components having numerical apertures of NA<1 removed.

3. The optical pickup device according to claim 1, wherein the optical system has an optical lens that adjusts a focus position of the light having the second wavelength so that the light having the second wavelength is focused at a point out of interfaces between any two different media in an optical path of the light having the second wavelength, the optical lens being arranged in the optical path of the light having the second wavelength before being multiplexed with the light having the first wavelength in the optical system.

4. The optical pickup device according to claim 3, wherein the light having the second wavelength is focused at a point inside the recording medium.

5. The optical pickup device according to claim 1, wherein the first wavelength differs from the second wavelength.

6. A recording/reproducing device comprising:
an optical pickup section;
a mounting section that mounts an optical recording medium having at least two recording layers; and
a drive section that moves the mounting section relative to the optical pickup section,
wherein the optical pickup section includes,
a near-field optical system having a numerical aperture of NA>1,
a first light source that emits light having a first wavelength and a second light source that emits light having a second wavelength,
an optical system that multiplexes the light having the first wavelength and the light having the second wavelength, and irradiates the multiplexed light onto the optical recording medium,
a first photodetector that detects the light having the first wavelength returned from the optical recording medium and a second photodetector that detects the light having the second wavelength returned from the optical recording medium,
a controller that obtains a signal corresponding to a variable distance between a lens-end-surface of the near-field optical system and a surface of the optical recording medium based on the light having the second wavelength returned from the optical recording medium, and obtains a reproducing signal of the optical recording medium, a tracking signal of the optical recording medium and a focus signal corresponding to each of the recording layers of the optical recording medium based on the light having the first wavelength returned from the optical recording medium, and a focus position adjustment mechanism arranged in an optical path of the light having the first wavelength that moves a focus position of the light having the first wavelength under control of the focus signal, the focus position being formed inside the optical recording medium.

7. The optical pickup device of claim 1, wherein the controller uses the signal corresponding to the variable distance between the lens-end-surface of the near-field optical system and the surface of the optical recording medium to control the variable distance.

8. The optical pickup device of claim 1, wherein the near-field optical system includes a hemispherical solid immersion lens and an aspheric lens.

9. The optical pickup device of claim 1, wherein the controller obtains the signal corresponding to the variable distance between the lens-end-surface of the near-field optical system and the surface of the optical recording medium based on the light having the second wavelength that is defocused from the surface of the optical recording medium and returned from the optical recording medium.

10. The optical pickup device of claim 1, further comprising an actuator that controls the variable distance between the lens-end-surface of the near-field optical system and the surface of the optical recording medium based on the signal obtained by the controller.

11. The optical pickup device of claim 1, wherein the controller obtains the signal corresponding to the variable distance between the lens-end-surface of the near-field optical system and the surface of the optical recording medium based on a rotation in a polarization direction of the light having the second wavelength reflected from the optical recording medium relative to a direction perpendicular to a polarization direction of outgoing light from the second photodetector.

12. The optical pickup device of claim 1, wherein the focus position adjustment mechanism is arranged only in the optical path of the light having the first wavelength and not in an optical path of the light having the second wavelength.

13. The optical pickup device of claim 12, further comprising an actuator that controls the variable distance between the lens-end-surface of the near-field optical system and the surface of the optical recording medium based on the signal obtained by the controller without interruption from a focusing operation with the focus signal since the focus position adjustment mechanism is arranged only in the optical path of the light having the first wavelength and not in an optical path of the light having the second wavelength.

14. The optical pickup device of claim 1, further comprising:
an optical lens in an optical path of the light having the second wavelength that causes the light having the second wavelength to be defocused from the surface of the recording medium.

15. The optical pickup device of claim 14, wherein the light having the second wavelength is focused at a position other than a boundary position between any two different media in the optical path of the light having the second wavelength.

* * * * *